United States Patent [19]

Mayer

[11] Patent Number: 4,704,984
[45] Date of Patent: Nov. 10, 1987

[54] DISPLAY DEVICE

[75] Inventor: Klaus Mayer, Obertshausen, Fed. Rep. of Germany

[73] Assignee: VDO Adolf Schindling AG, Frankfurt/Main, Fed. Rep. of Germany

[21] Appl. No.: 829,683

[22] Filed: Feb. 14, 1986

[30] Foreign Application Priority Data

Feb. 2, 1985 [DE] Fed. Rep. of Germany ....... 3505735

[51] Int. Cl.⁴ ...................... G01D 11/28; G01D 13/22
[52] U.S. Cl. .................................... 116/287; 116/301; 116/305; 116/DIG. 6
[58] Field of Search ...................... 116/62.4, 286, 287, 116/301, 305, DIG. 5, DIG. 6

[56] References Cited

U.S. PATENT DOCUMENTS

| 2,656,447 | 10/1953 | Darner et al. | 116/301 |
| 2,760,374 | 8/1956 | Gottsch | 116/301 |
| 2,782,752 | 2/1957 | Dorn et al. | 116/301 |
| 3,068,833 | 12/1962 | Hoffman | 116/287 |
| 3,554,157 | 1/1971 | Haughtington et al. | 116/301 |
| 3,698,353 | 10/1972 | Nakahata et al. | 116/301 |
| 4,194,587 | 3/1980 | Shino et al. | 116/62.4 |

FOREIGN PATENT DOCUMENTS 348522 2/1922 Fed. Rep. of Germany ...... 116/301

Primary Examiner—Richard R. Stearns
Attorney, Agent, or Firm—Martin A. Farber

[57] ABSTRACT

A display device for the displaying of two measured values on a graduated dial 1 which has two scales 4 and 5 arranged concentrically to each other. Two pointers 6 and 7 are turnable around pointer shafts 8 and 9 which are coaxial to each other and each of which is associated with a separate scale 5 and 6, each pointer 6 and 7 being adapted to be driven in rotation by separate measurement mechanisms 13 and 14 respectively. The measurement mechanisms 13 and 14 are arranged coaxially to each other on opposite sides of the graduated dial 1 and the ends of the pointer shafts which carry the pointers 6 and 7 face each other.

12 Claims, 2 Drawing Figures

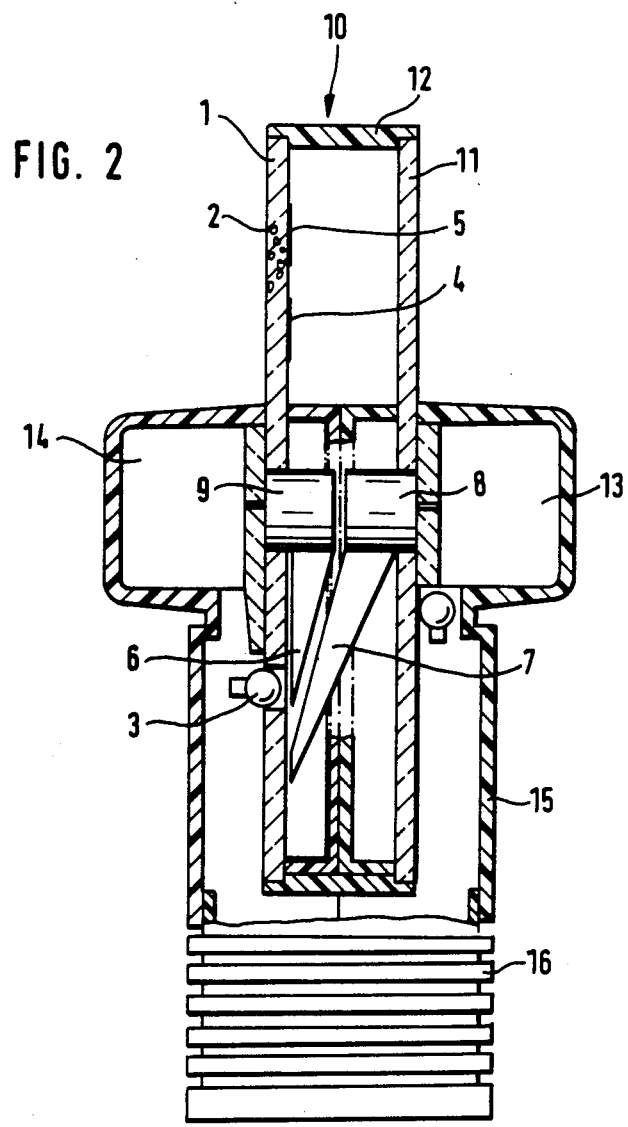

DISPLAY DEVICE

FIELD AND BACKGROUND OF THE INVENTION

The present invention relates to a display device for displaying two measured values on a graduated dial which is provided with two scales arranged concentrically to each other and has two pointers each associated with a respective one of the scales and rotatable around pointer shafts which are coaxial to each other, each pointer being adapted to be driven in rotation by its own measurement mechanism.

In such display devices it is known to arrange the measurement mechanisms on the side of the graduated dial which faces away from the observer. This results in a large expense in order to transmit the rotary drive of the measurement mechanisms to the coaxial pointers.

The object of the present invention, accordingly, is to create a display of the above type which permits rotational drive of the pointers in only a small amount of space and with only a few parts being required.

SUMMARY OF THE INVENTION

This object is achieved in accordance with the present invention in the manner that the measurement mechanisms are arranged coaxially to each other on opposite sides of the graduated dial and that the ends of the pointer shafts which carry the pointers face each other.

This development makes it possible to arrange the pointer shafts coaxial to the driven shafts of the measurement mechanisms so as to eliminate space-consuming transmission gears which require additional parts between the measurement mechanisms and the pointers.

The measurement mechanisms can be arranged in a housing which engages in U-shaped manner around the graduated dial in a region outside the graduations or in a housing which extends through the graduated dial in a region outside the graduations, which housing can be provided at the same time with a base.

In particular, in the case of an opaque graduated dial the pointer shaft of one pointer passes through an opening in the graduated dial and the two pointers are arranged on the same side of the graduated dial.

In order to distinguish which pointer is associated with which scale, the pointer which is closer to the graduated dial can be of a slightly smaller length than the pointer which is further away from the graduated dial.

In this way it is also possible for the free ends of the pointers to be inclined towards the graduated dial, whereby an unambiguous reading of the values indicated from different positions of the viewer is assured.

If the scales are spaced radially from each other, then each of the pointer tips is unambiguously associated with a given scale.

For protection against damage and dirt, the pointers can now be preferably arranged within a compartment which is formed by the graduated dial and a transparent cover disk arranged at a distance therefrom on the viewer's side.

The arrangement of the measurement mechanisms coaxially one behind the other and thus their only small radial size is of particular advantage when the graduated dial is formed as a transparent plate which can be passed through by light from the side facing away from the viewer, the opaque scales being arranged on said plate, since in this way the greatest part of the graduated dial is free also on its rear and therefore transmits light well.

As a further development, the graduated dial can be developed as an illuminatable light-guide plate within which light-deflecting particles are arranged so that dependable reading of the measured values is possible even in the dark.

The display device can preferably be arranged on the instrument panel of an automobile and be passed through by light entering from the windshield.

BRIEF DESCRIPTON OF THE DRAWINGS

One embodiment of the invention is shown in the drawing and will be described in further detail below.

FIG. 2 shows the display device of FIG. 1 in a section along the line II—II.

DETAILED DESCRIPTION OF THE PREFERRED EMBODIMENT

Figure 1:
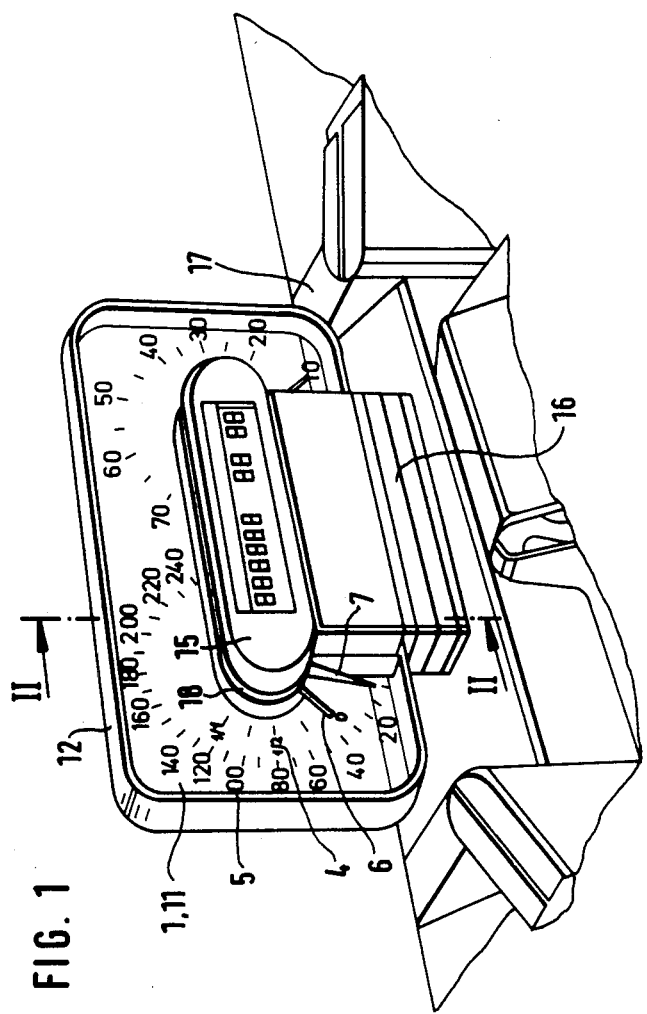
FIG. 1 is a perspective view of a display device.

The display device shown in the drawing has a graduated dial 1 developed as a transparent light-guide plate within which light-deflecting particles 2 are arranged.

From a source of light 3 light can be introduced into the graduated dial 1 so that said dial forms a diffusely bright background for two opaque scales 4 and 5 arranged concentrically to each other on the surface of the graduated dial 1.

The scales 4 and 5 are arranged spaced radially from each other and are passed over by respective pointers 6 and 7 located on the viewer side of the graduated dial 1. The pointers 6 and 7 are turnable around pointer shafts 8 and 9 which are coaxial to each other.

The pointer 6 which is closer to the graduated dial 1 is shorter than the pointer 7. Since both pointers 6 and 7 are inclined toward the graduated dial 1, the tips of the pointers extend up to the corresponding scales 4 and 5 respectively.

The pointers 6 and 7 are arranged within a compartment 10 which is formed by the graduated dial 1 and a cover disk 11 of the same shape, arranged at a distance in front of the dial as well as a frame 12 which surrounds the circumferential edges of cover disk 11 and the graduated dial 1.

Coaxial to the pointer shafts 8 and 9 on each side of the compartment 10 there are measurement mechanisms 13 and 14 respectively, the driven shaft 8 of the measurement mechanism 13 passing through a cutout in the cover disk 11 and being connected to the pointer 7.

The two measurement mechanisms 13 and 14 are arranged in a housing 15 which surrounds the compartment 10 in U shape, the region of the scales 4 and 5 remaining exposed, however, so that ambient light from the side facing away from the viewer can pass to the viewer through the graduated dial 1 and the cover disk 11.

The pointers 6 and 7 extend radially through a slot 18 out of the housing 15 into the compartment 10 and thus swing along the scales 4 and 5.

The bottom of the U-shaped housing 15 is connected to a bellows-like base part 16 which is arranged on an instrument panel 17 of an automobile in the direct field of view of the driver. In this way the housing 15 and the compartment 10 can be swung into the optimal field of view of the driver.

Due to the fact that the measurement mechanisms 13 and 14 are cross-coil rotary-magnet measurement mechanisms of only small structural size, the housing 15 also need only be of small structural size and thus does not constitute any substantial impairment in the readability of the graduated dial 1.

I claim:

1. In a display device for displaying two measured values on a graduated dial which is provided with two scales arranged concentrically to each other, the display device including two pointers which are turnable by coaxial pointer shafts, each pointer being coordinated to a separate one of the scales, and each pointer being driven in rotation by a separate measurement mechanism, the improvement comprising:
   a housing,
   said measurement mechanisms are arranged in said housing coaxially to each other on opposite sides of the graduated dial, and
   said pointer shafts have ends which face each other, said pointers are mounted on said ends of said pointer shafts, respectively, wherein
   said graduated dial being mounted in said housing at a portion of said graduated dial spaced away from said scales and leaving said scales unobstructed, and said graduated dial is a transparent plate which enables light to pass therethrough from a side thereof facing away from a viewer, and
   said scales are opaque scales arranged on said plate, and
   said housing is configured so as to leave the graduated dial in the region of the scales free on said side facing away from the viewer so as to provide an unobstructed path for illumination from said side of said transparent plate facing away from the viewer to permit ambient light from said side facing away from the viewer to pass through said transparent plate to the viewer for viewing said scales.

2. The display device according to claim 1, further comprising:
   light-deflecting particles disposed in said transparent plate, and
   said graduated dial is an illuminable light-guide plate, and
   means for illuminating said light-guide plate, whereby said light-deflecting particles provide a diffusely bright background for said scales.

3. The display device according to claim 1, wherein said graduated dial is formed with an opening,
   the shaft of one of said pointers passes through said opening in said graduated dial, and
   both of said pointers are arranged on a same side of the graduated dial.

4. The display device according to claim 3, wherein said one pointer which is closer to the graduated dial than the other of said pointers has a shorter length than said other pointer.

5. The display device according to claim 1, wherein said scales are radially spaced from each other.

6. The display device according to claim 1, wherein said graduated dial is a transparent plate which enables light to pass therethrough from a side thereof facing away from a viewer, and
   said scales are opaque scales arranged on said plate.

7. In a display device for displaying two measured values on a graduated dial which is provided with two scales arranged concentrically to each other, the display device including two pointers which are turnable by coaxial pointer shafts, each pointer being coordinated to a separate one of the scales, and each poninter being driven in rotation by a separate measurement mechanism, the improvement wherein
   said measurement mechanisms are arranged coaxially to each other on opposite sides of the graduated dial, and
   said pointer shafts have ends which face each other, said pointers are mounted on said ends of said pointer shafts, respectively, and wherein
   a U-shaped housing surrounds a portion of the graduated dial away from said two scales in a U shape manner not covering said scales, and
   the two measurement mechanisms are arranged within said housing.

8. The display device according to claim 7, wherein said housing has a base part.

9. In a display device for displaying two measured values on a graduated dial which is provided with two scales arranged concentrically to each other, the display device including two pointers which are turnable by coaxial pointer shafts, each pointer being coordinated to a separate one of the scales, and each pointer being driven in rotation by a separate measurement mechanism, the improvement wherein
   said measurement mechanisms are arranged coaxially to each other on opposite sides of the graduated dial, and
   said pointer shafts have ends which face each other, said pointers are mounted on said ends of said pointer shafts, respectively, and wherein
   said display device further comprises
   a housing which extends through the graduated dial within a region of the graduated dial away from the two scales, and wherein
   the two measurement mechanisms are arranged in said housing.

10. The display device according to claim 9, wherein said housing has a base part.

11. In a display device for displaying two measured values on a graduated dial which is provided with two scales arranged concentrically to each other, the display device including two pointers which are turnable by coaxial pointer shafts, each pointer being coordinated to a separate one of the scales, and each pointer being driven in rotation by a separate measurement mechanism, the improvement wherein
   said measurement mechanisms are arranged coaxially to each other on opposite sides of the graduated dial, and
   said pointer shafts have ends which face each other, said pointers are mounted on said ends of said pointer shafts, respectively, and wherein
   said graduated dial is formed with an opening,
   the shaft of one of said pointers passes through said opening in said graduated dial, and
   both of said pointers are arranged on a same side of the graduated dial, wherein
   said one pointer which is closer to the graduated dial than the other of said pointers has a shorter length than said other pointer, and
   said pointers have free ends, said free ends are inclined towards the graduated dial.

12. In a display device for displaying two measured values on a graduated dial which is provided with two scales arranged concentrically to each other, the display device including two pointers which are turnable by coaxial pointer shafts, each pointer being coordinated to a separate one of the scales, and each pointer being driven in rotation by a separate measurement mechanism, the improvement wherein said measurement mechanisms are arranged coaxially to each other on opposite sides of the graduated dial, and said pointer shafts have ends which face each other, said pointers are mounted on said ends of said pointer shafts, respectively, wherein said graduated dial is formed with an opening, the shaft of one of said pointers passes through said opening in said graduated dial, and both of said pointers are arranged on a same side of the graduated dial, and wherein said display device further comprises a transparent cover disc arranged spaced from said graduated dial at a viewer's side of the display device, said graduated dial and said cover disc define a compartment therebetween, said pointers are arranged within said compartment.

* * * * *